United States Patent [19]
Ellzey, Jr.

[11] Patent Number: 5,541,463
[45] Date of Patent: Jul. 30, 1996

[54] FLEX PATH AND CORE LOSS REDUCTION ASSEMBLY

[75] Inventor: Lucian L. Ellzey, Jr., Oklahoma City, Okla.

[73] Assignee: EKO Technologies, Inc., Oklahoma City, Okla.

[21] Appl. No.: 77,617

[22] Filed: Jun. 15, 1993

[51] Int. Cl.⁶ .................................................. H02K 1/22
[52] U.S. Cl. .......................... 310/261; 310/184; 310/198; 310/254; 310/258
[58] Field of Search ............................ 310/261, 43, 254, 310/45, 89, 206, 198, 207, 208, 258, 180, 184, 166, 216; 318/701

[56] References Cited

U.S. PATENT DOCUMENTS

| | | | |
|---|---|---|---|
| 2,328,743 | 9/1943 | Roters | 172/278 |
| 2,544,571 | 3/1951 | Trickey | 310/166 U X |
| 2,547,599 | 4/1951 | Roters | 318/166 |
| 3,353,046 | 11/1967 | Papst | 310/208 U X |
| 3,441,764 | 4/1969 | Grooms | 310/208 U X |
| 3,553,508 | 1/1971 | Stcherbatcheff | 310/261 U X |
| 3,594,595 | 7/1971 | Williams | 310/207 |
| 3,758,800 | 9/1973 | McLaughlin | 310/261 U X |
| 4,118,644 | 10/1978 | Schulte | 310/89 |
| 4,390,805 | 6/1983 | Hahn . | |
| 4,883,999 | 11/1989 | Hendershot | 310/254 |
| 5,053,666 | 10/1991 | Kliman | 310/261 |
| 5,105,115 | 4/1992 | Shinryo | 310/258 |
| 5,113,103 | 5/1992 | Blum | 310/89 |
| 5,179,307 | 1/1993 | Porter . | |
| 5,298,822 | 3/1994 | Bosman | 310/89 |

FOREIGN PATENT DOCUMENTS 2445054  7/1980  France .

*Primary Examiner*—R. Skudy
*Attorney, Agent, or Firm*—Dunlap & Codding, P.C.

[57] ABSTRACT

A flux path and core loss reduction assembly is provided. The assembly comprises a magnetizable peripheral rotor section upon which armature windings are disposed, isolated from the rest of the assembly by a non-magnetizable core. The assembly also comprises a magnetizable inner stator section upon which armature windings are disposed, isolated from the rest of the assembly by a non-magnetizable enclosure. The assembly additionally comprises flux path reduction windings wound to reduce the magnetic flux paths created when the windings are electromagnetically activated by a current. The assembly further comprises a programmable control for varying the rotor speed by varying the switching rate of stator winding polarity.

3 Claims, 9 Drawing Sheets

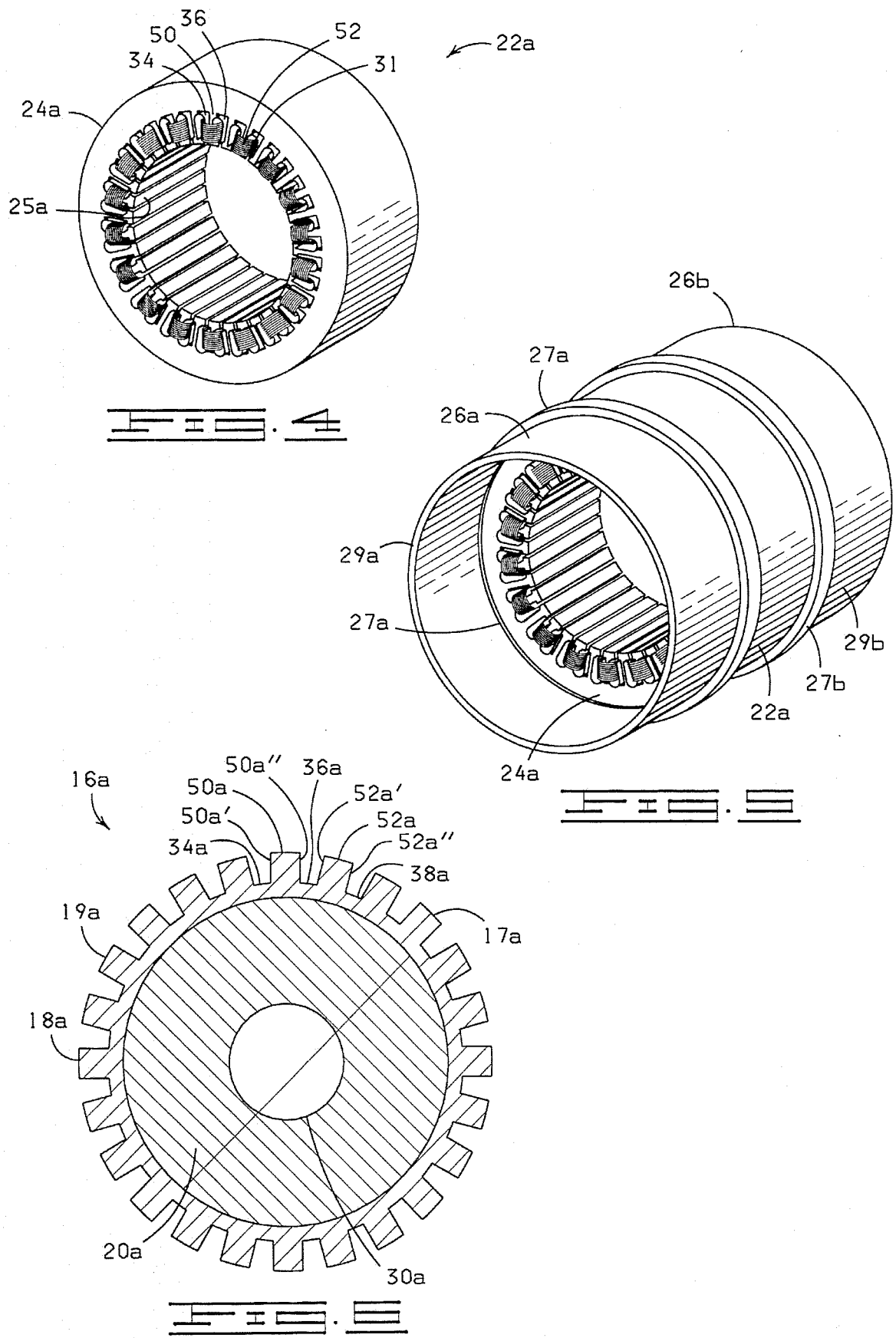

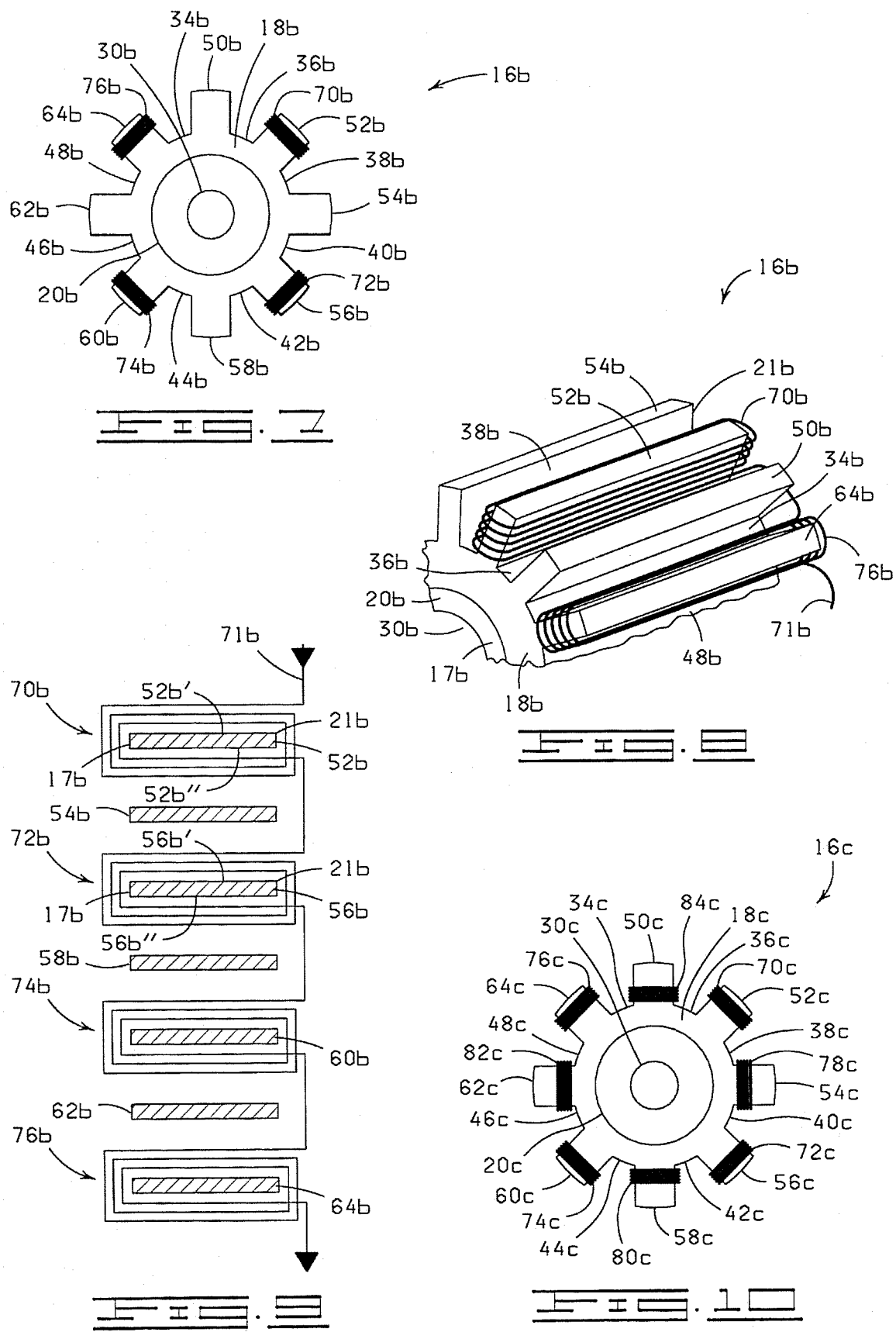

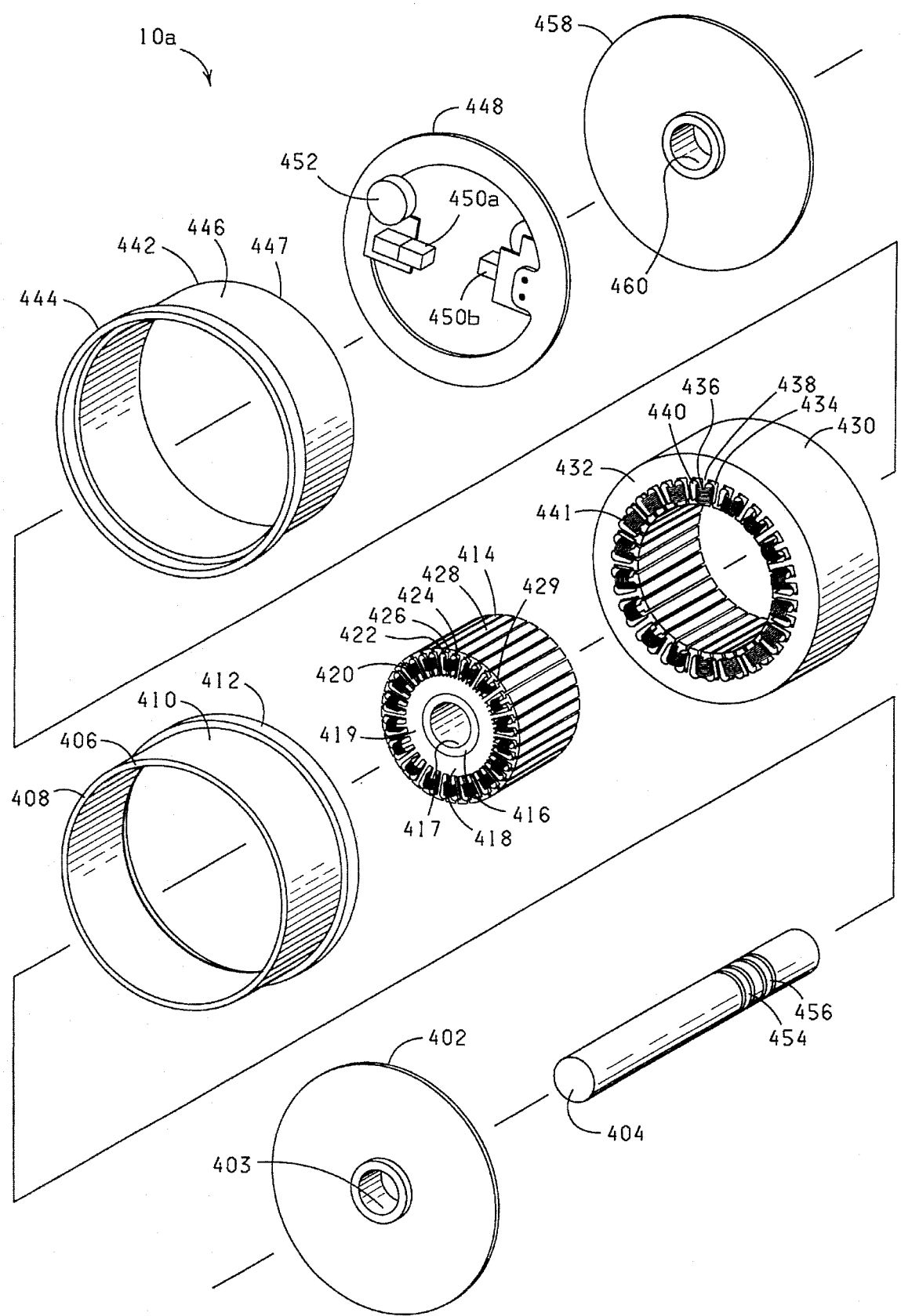

5,541,463

FLEX PATH AND CORE LOSS REDUCTION ASSEMBLY

FIELD OF THE INVENTION

The present invention relates to electromechanical devices, and more particularly to electromechanical devices having rotors and stators constructed to reduce the flux paths associated with electromagnetic windings in order to reduce path or core loss.

SUMMARY OF THE INVENTION

Electromechanical devices, such as electric motors, traditionally have had an efficiency of less than thirty percent. One reason for this is that they have had long flux paths relative to the number of turns of wire per electromagnetic winding (such as an armature winding) which has resulted in the production of a low magnetizing force relative to the power used to provide the magnetizing force.

For a given wire size and number of turns of winding wire, the present invention reduces the magnetic flux path, which has the effect of increasing the efficiency of electromagnetic devices, such as motors or generators, having four or more magnetic poles.

Magnetizing force (using sinusoidal wave forms) is proportional to current flow and turns of wire in the winding, and is inversely proportional to the flux path length of the magnet or electromagnet, as shown by the formula:

$$H = \frac{(0.4947)(N)(I)}{l}$$

where H is the magnetizing force, expressed in Oersteds, N is the number of winding turns, 0.4947 is a numerical constant to convert ampere-turns per inch to Oersteds, I is the current in amperes, and l is the magnetic flux path length in inches.

By reducing the flux path length, the present invention acts to increase H for a given amperage or number of winding turns, or to maintain H with a reduced amperage level or number of winding turns, resulting in increased efficiency.

BRIEF DESCRIPTION OF THE DRAWINGS

FIG. 4 is a left perspective view of a stator constructed in accordance with the present invention.

FIG. 5 is a perspective view of the stator shown in FIG. 4 disposed within two of the enclosures shown in FIG. 3.

FIG. 6 is an end view of a rotor constructed in accordance with the present invention, showing a polarity of flux path reduction slots and pole posts formed in the magnetizable peripheral section of the rotor.

FIG. 7 is an end view of a rotor similar in construction to the rotor shown in FIG. 6, but showing the disposition of four rotor flux path reduction windings on the rotor.

FIG. 8 is a partial perspective view of the rotor shown in FIG. 7, showing two of the rotor flux path reduction windings wound on the rotor.

FIG. 9 is a schematic diagram of the rotor flux path reduction windings showing in FIG. 7.

FIG. 10 is an end view of a rotor constructed in exactly the same manner as the rotor shown in FIG. 7, but having eight rotor flex path reduction windings disposed on the rotor.

FIG. 16 is an exploded view of a flux path and core loss reduction assembly constructed in accordance with the present invention.

DESCRIPTION OF THE PREFERRED EMBODIMENTS

Figure 1:
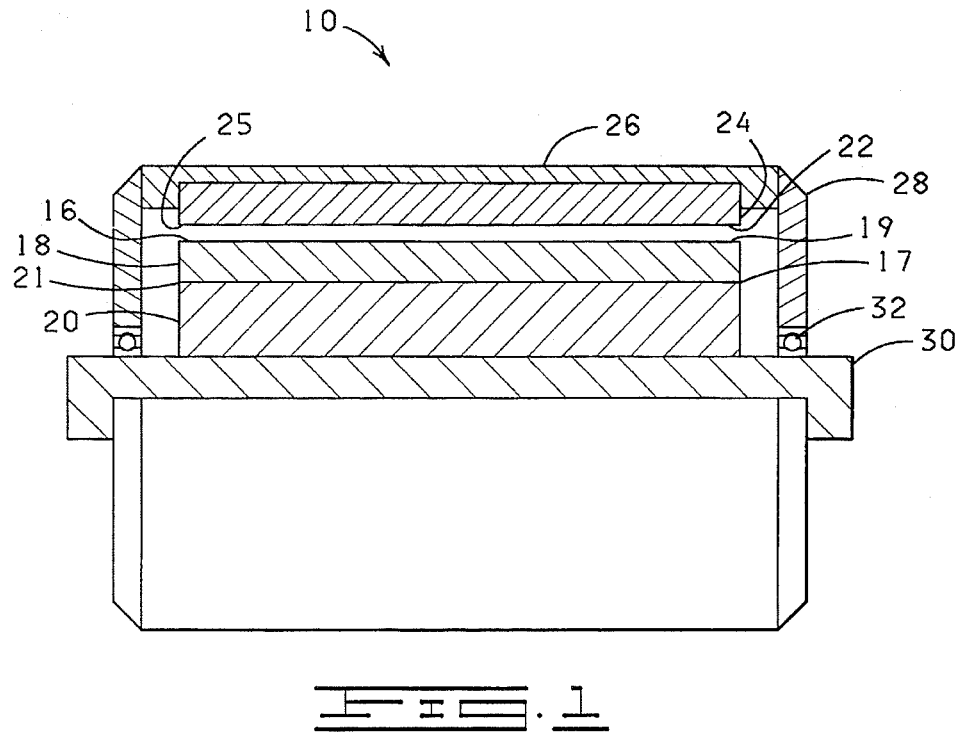
FIG. 1 shows a side cutaway diagrammatic view of an electric motor constructed in accordance with one embodiment of the present invention.

Shown in FIG. 1 is a diagrammatic view of an electromagnetic device, such as an electric motor or generator, incorporating one embodiment of a flux path and core loss reduction assembly, which is generally identified by the numeral 10. The assembly 10 includes a rotor 16 having a first end 17, a magnetizable peripheral section 18, a sidewall 19, a second end 21, and a core 20. In a preferred embodiment of the invention, the core 20 will be composed of a non-magnetizable material, such as aluminum.

The assembly 10 also comprises a stator 22 comprising an inner section 24 having an inner surface 25, the inner section 24 being constructed of a magnetizable material, such as iron or iron laminates. The stator 22 further comprises an enclosure 26 and a case 28. The assembly 10 additionally comprises a rotor shaft 30 which pierces the rotor 16 and extends generally from the first end 17 and the second end 21 of the rotor 16. As shown in FIG. 1, the rotor shaft 30 is supported by a shaft bearing assembly 32, which is in turn, connected to the case 28, and which allows the rotor shaft 30 to rotate freely within the stator 22.

Figure 2:
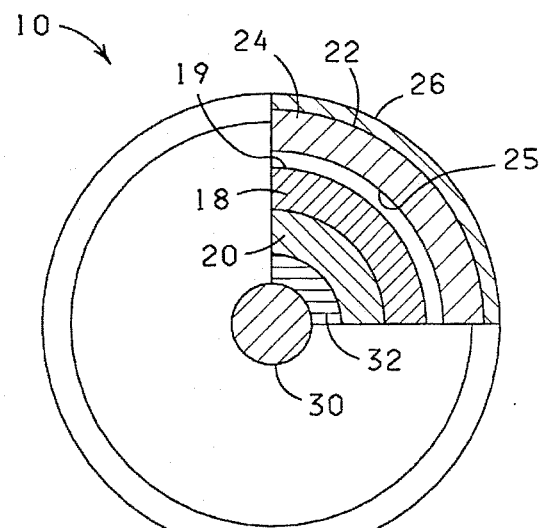
FIG. 2 is a front cutaway view of the motor shown in FIG. 1.

In accordance with the invention, the core 20 of the rotor 16 is ordinarily comprised of a non-magnetizable material; however, if the core 20 is composed of a magnetizable material, such as iron, or if the core 20 is eliminated, the rotor shaft 30 must be composed of a non-magnetizable material, such as aluminum. In some embodiments of the invention, the rotor shaft will have a diameter which is at least half as great as the diameter of the rotor 16. If the rotor 16 comprises a magnetizable peripheral section 18 and a non-magnetizable core section 20, the diameter of the core 20 is ordinarily at least half the diameter of the rotor 16. As shown in FIG. 2, the diameter of the core section 20 and the rotor shaft 30, taken together, is greater than half the diameter of the rotor 16.

The non-magnetic core 20 operates to isolate the magnetizable section 18 from the rest of the rotor 16 and from the remainder of the assembly 10. This has the effect of reducing the flux path length of the rotor 16, which, in a conventional electromagnetic device, would be generally equivalent to the diameter of the rotor 16. It is understood that, in the assembly 10 shown in FIGS. 1 and 2, conventional electric windings are disposed on the stator 22 and the rotor 16. The stator 22 and the rotor 16 may be partially composed of rotor laminates and stator laminates, as are currently used in the art, however, the rotor 16 has a non-magnetizable core 20 and the stator 22 will comprise a magnetizable inner section 24 and a enclosure 26 which, preferably, is also non-magnetizable, being constructed of aluminum, plastic, or other non-magnetizable material. For purposes of the present invention, it is understood that all electromagnetic devices referred to herein will have four or more electromagnetic poles.

Figure 3:
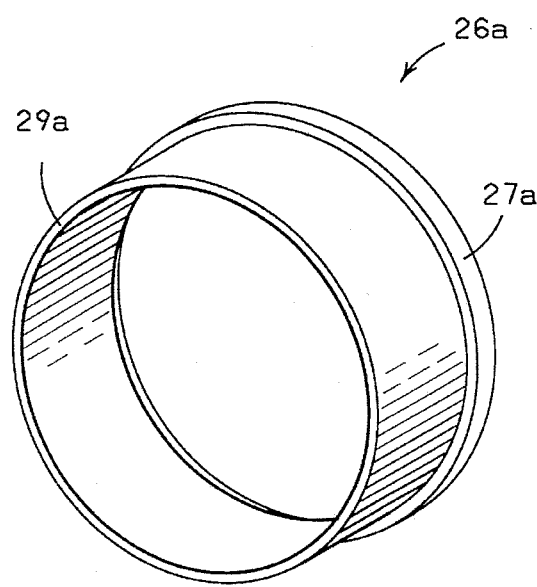
FIG. 3 is a left perspective view of an enclosure constructed in accordance with the present invention.

FIG. 3 shows a preferred embodiment of a stator enclosure 26a constructed in accordance with the invention. The enclosure 26a comprises a shield ring 27a which is composed of a non-magnetizable material, such as aluminum, and a shell 29a, which can be composed of a magnetizable or nonmagnetizable material. The shell 29a is ordinarily constructed of steel.

FIG. 4 shows a stator 22a, constructed in accordance with the present invention. The stator 22 comprises an inner section 24a comprised of a magnetizable material, such as iron or iron laminates. The inner section 24a has an inner surface 25a, which is formed into thirty-six flux path reduction slots, two of which have been designated by the numerals 34 and 36. Between each pair of reduction slots is a pole post, one of which has been designated by the numeral 50. Insulation, such as insulation paper 31 is disposed in each of the flux path reduction slots to isolate a portion of the armature windings, such as armature winding 52, from a portion of the inner section 24a. The armature windings, such as armature winding 52, are constructed in accordance with the present invention and are explained in detail below.

Armature windings constructed in accordance with the present invention are also called herein "flux path reduction windings". FIG. 4 shows a stator wound with eighteen armature windings, resulting in a thirty-six electromagnetic pole stator, but any even number of windings, providing at least four electromagnetic poles, can be used in other embodiments of the invention.

FIG. 5 shows the stator enclosure 26a and a stator enclosure 26b, constructed exactly in the same manner as the stator enclosure 26d, connected to the stator 22a. The shield ring 27a of the enclosure 26a cooperates with the shield ring 27b of the enclosure 26b to magnetically isolate the inner section 24a of the stator 22a from the enclosure shells 29a and 29b.

FIG. 6 shows a first end 17a of rotor 16a modified in accordance with the present invention. The rotor 16a consists of a non-magnetizable core section 20a, a rotor shaft 30a and a magnetizable peripheral section 18a, which preferably comprises iron or a magnetizable laminate. The invention additionally consists of a polarity of flux path reduction slots, three of which are denominated in the drawings as 34a, 36a and 38a. The flux path reduction slots are formed from the sidewall 19a of the rotor 16a and extend from a first end 17a to a second end 21a of the rotor 16a (second end 21a not shown). Between each two flux path reduction slots, such as 34a and 36a, there is a pole post 50a. The pole post has sides 50a' and 50a" which are defined by the flux path reduction slots 34a and 36a. The pole slots such as pole slots 50a and 52a, extend from the first side 17a of the rotor 16a to the second side 21a of the rotor 16a. As a result, the sidewall 19a is configured in a series of parallel grooves which extend parallel to a rotor shaft 30a around the circumference of the rotor 16a.

Lap windings, as traditionally used in electromagnetic devices, can be wound upon the rotor 16a using the flux path reduction slots. The core section 20a provides sufficient isolation of the electromagnetic windings to provide a reduction in the flux path.

In some embodiments of the invention, the magnetic source on the stator or the rotor can be supplied by permanent magnets. In still other embodiments of the invention, the stator or the rotor can be constructed in a conventional manner, with the corresponding rotor or stator constructed in accordance with the present invention.

Additional efficiencies can be achieved by using flux path reduction windings in combination with the flux path reduction slots, the pole posts, and the non-magnetizable core. Shown in FIG. 7 is an end view of rotor 16b, similar in construction to the rotor 16a. The rotor 16b includes a magnetizable peripheral section 18b, a non-magnetizable core 20b, a rotor shaft 30b pole slots 34b, 36b, 38b, 40b, 42b, 44b, 46b and 48b disposed between flux path reduction posts 50b, 52b, 54b, 56b, 58b, 60b, 62b and 64b. Disposed upon the rotor 16b are four flux path reduction windings 70b, 72b, 74b, 76b and 78b.

Flux path reduction winding 70b is wound upon pole post 52b, a portion of the winding 70b extending into flux path reduction slot 36b and an additional portion of winding 70b extending into flux path reduction slot 38b. Similarly, flux path reduction winding 72b is disposed on pole post 56b, and a portion of winding 72b is disposed in flux path reduction slot 40b, with an additional portion of winding 72b being disposed in flux path reduction slot 42b. Flux path reduction windings 74b and 76b are similarly disposed on the rotor 16b, with a winding-free pole post, such as pole post 54b, disposed between each two of the flux path reduction windings 70b, 72b, 74b, 76b.

FIG. 8 is a partial perspective view of the rotor 16b shown in FIG. 7, further showing the representative disposition of flux path reduction windings 70b and 76b on the rotor 16b.

Shown in FIG. 9 is a schematic diagram of the flux path reduction windings 70b, 72b, 74b, and 76b disposed on the rotor 16b. The flux path reduction windings 70b, 72b, 74b, and 76b, are all wound from a wire 71b. It is understood that the wire 71b can be a multiple stranded or single stranded wire. The wire 71b is fed from the second end 21b of the rotor 16b through the flux path reduction slot 36b (not shown) around a side 52b' of the pole post 52b and down a side 52b" of the pole post 52b. The flux path reduction winding 70b is further wound around sides 52b' and 52b" of the pole post 52b for an appropriate number of turns, based on the design parameters of a particular electromagnetic device (three turns are shown in FIG. 9).

The wire 71b is then fed on the end 21b past pole post 54b, whereupon the wire 71b is fed up side 56b' of pole post 56b, around pole post 56b and down side 56" of pole post 56b and again up the side 56b' of pole post 56b, the winding in this example consisting of three turns, whereupon the pattern is repeated for the flux path reduction windings 74b and 76b. The effect of winding the flux path reduction windings 70b, 72b, 74b, and 76b in this manner, is to create magnetic flux paths which generally are confined to the area of each of the pole posts, 52b, 56b, 60b, and 64b.

FIG. 10 shows a rotor 16c constructed in exactly the same manner as the rotor 16b shown in FIG. 7, and having a nonmagnetizable core 20c and a rotor shaft 30c, except the rotor 16c in FIG. 10 has two sets of flux path reduction windings disposed thereon. A first set of flux path reduction windings 70c, 72c, 74c and 76c is disposed on pole posts 52c, 54c, 56c, 58c, and 62c, respectively. A second set of flux path reduction windings, 78c, 80c, 82c and 84c is disposed on pole slots 54c, 58c, 62c and 64c respectively.

Figure 11:
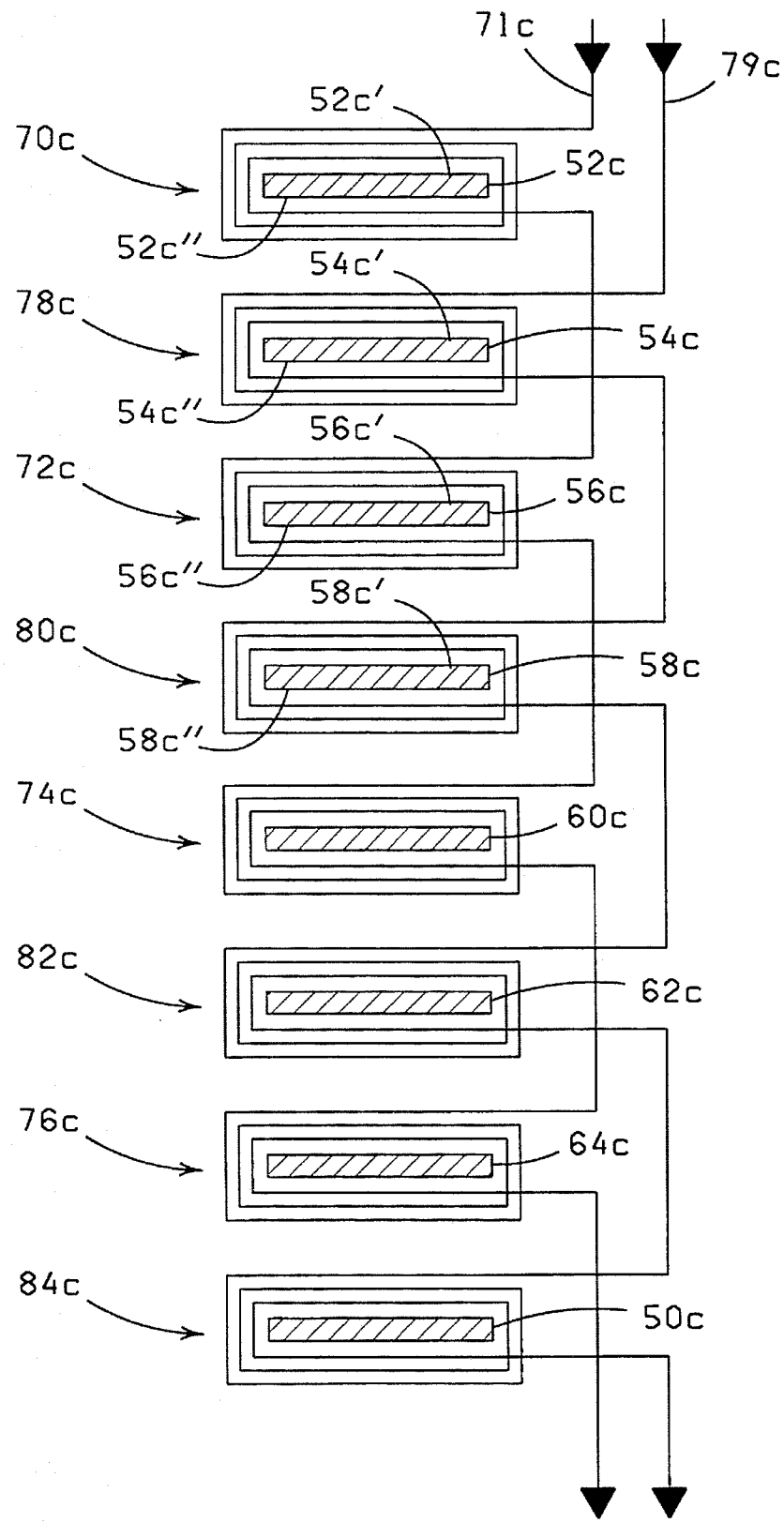
FIG. 11 is a schematic diagram of the rotor flux path reduction windings shown in FIG. 10.

As shown in FIG. 11, the first set of flux path reduction windings is wound from a wire 71c, whereas the second set of flux path reduction windings is wound from a wire 79c. It is understood that the wires 71c and 79c can be single or multiple stranded wires. The first set of flux path reduction windings 70c, 72c, 74c, and 76c, are disposed upon the rotor 16c in exactly the same manner as the flux path reduction windings 70b, 72b, 74b, and 76b, are disposed on the rotor 16b shown in FIG. 7. FIG. 10 shows the flux path reduction windings 78c, 80c, 82c, and 84c, disposed upon the pole posts 54c, 58c, 62c, and 50c in a similar manner, such that each of the pole posts in the rotor 16c has one flux path reduction winding disposed thereon.

In the embodiments of the invention shown in FIG. 7 and FIG. 10, the distance between pole posts such as the pole posts 52b and 54b in FIG. 7, or the pole posts 52c and 54c in FIG. 10, may be increased or decreased by varying the size of the flux path reduction slots, for example, slots 18b and 38b in FIG. 7 or 18c and 38c in FIG. 10. This will have the effect of moving the pole posts such as pole posts 52b and 54b in FIG. 7, or pole posts 52c and 54c in FIG. 10, closer together or farther apart. Moving the pole posts, such as pole posts 52c and 54c closer together will have the additional effect of increasing the magnetic attraction generated by a particular flux path reduction winding, and will also reduce the length of the magnetic flux path.

It is understood that the flux path reduction windings as shown in FIG. 7 and FIG. 10, will produce, when direct or alternating current is applied to them, via winding wire 71b, 71c or 79c, alternate magnetic poles such that the rotor 16b shown in FIG. 7 will, at any moment, have two north poles alternating with two south poles, and the rotor 16c shown in FIG. 10 will have, at any moment, four north poles alternating with four south poles. The use of electromagnetic windings to produce alternating north and south poles in electromechanical devices is well known to the art.

Shown in FIG. 11 is a schematic diagram of the flux-path reduction windings disposed on the rotor 16c shown in FIG. 10. Flux path reduction windings 70c, 72c, 74c and 76c are wound in series with a wire 71c and are disposed on pole posts 52c, 56c, 60c and 64c, respectively. Flux path reduction windings 78c, 80c, 82c and 84c are wound in series with a wire 79c and are disposed on pole posts 78c, 80c, 82c and 84c.

The electromagnetic windings shown in FIGS. 9 and 11 are shown as series windings, but it is understood that the windings can be parallel wound, or series-parallel wound in other embodiments.

Figure 12:
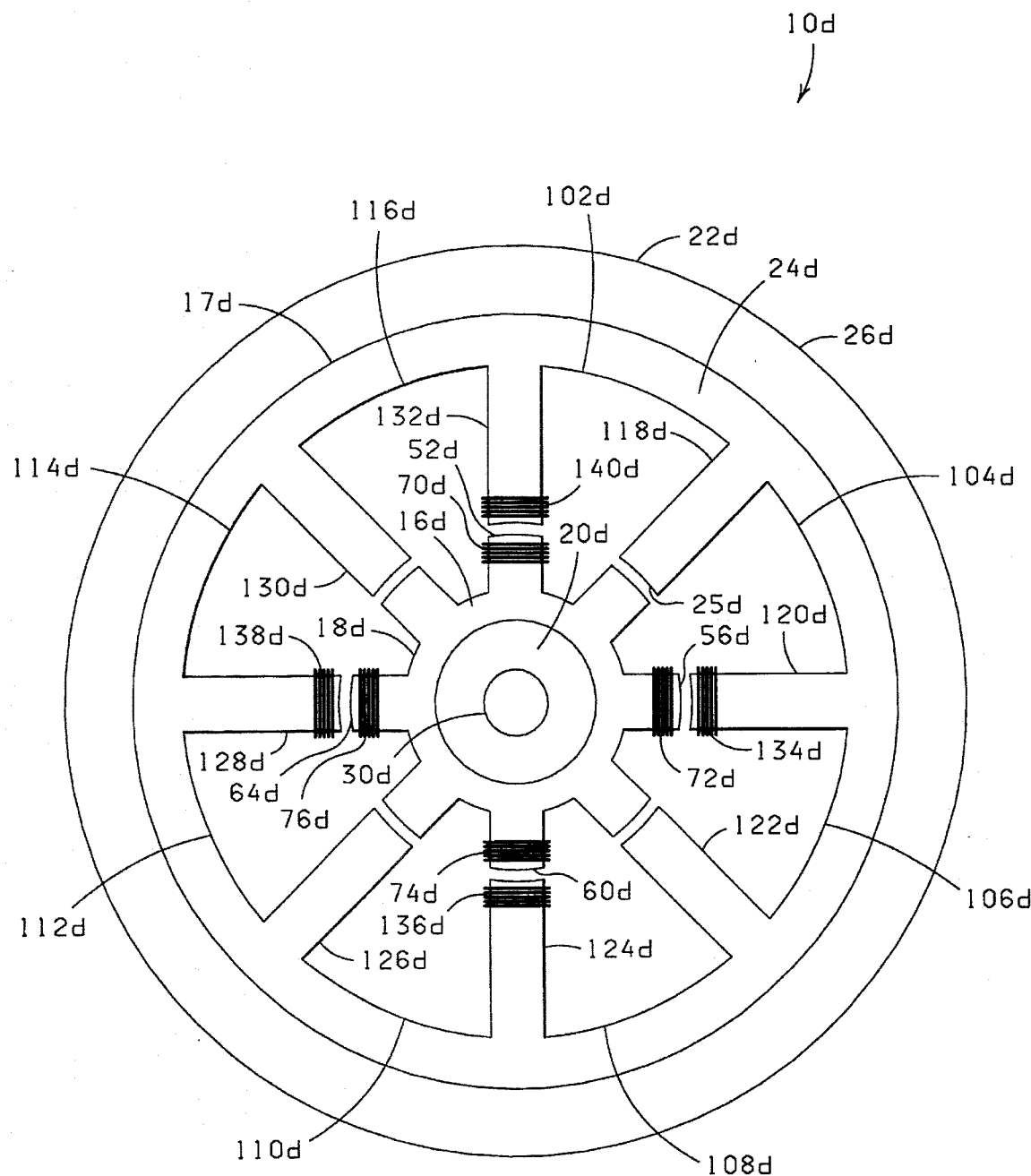
FIG. 12 is an end view of the rotor shown in FIG. 7 disposed within a stator assembly in accordance with the present invention.

Shown in FIG. 12 is an assembly 10d constructed in accordance with the present invention. The assembly 10d includes a stator 22d generally encompassing a rotor 16d, having a nonmagnetizable core 20d and a rotor shaft 30d the rotor 16d being constructed essentially the same as the rotor 16b shown in FIG. 7. The stator 22d includes a stator enclosure 26d, which, in a preferred embodiment, will be composed of a non-magnetizable material, such as aluminum. The stator 22d also includes an inner section 24d, further comprising an inner surface 25d composed of a magnetizable material such as iron or iron laminates.

The inner surface 25d of the inner section 24d is formed into a polarity of stator flux path reduction slots, eight of such slots being shown in FIG. 12 and designated by the numbers 102d, 104d, 106d, 108d, 110d, 112d, 114d, and 116d. The inner section 24d further comprises a polarity of pole posts. In addition, eight pole posts are shown, the pole posts being defined by the flux path reduction slots and bearing the numbers 118d, 120d, 122d, 124d, 126d, 128d, 130d, and 132d.

In this embodiment, the stator 22d also comprises four stator flux path reduction windings 134d, 136d, 138d, and 140d. The aforenumbered flux path reduction windings being wound on alternate stator pole posts in exactly the same manner as the rotor flux path reduction windings 70d, 72d, 74d, and 76d, are wound on alternate rotor pole posts.

The stator flux path reduction windings 134d, 136d, 138d, and 140d, wound on the stator pole posts 120d, 124d, 128d and 132d operate to reduce the electromagnetic flux paths in exactly the same manner as the rotor electromagnetic windings shown on rotor 16d.

Figure 13:
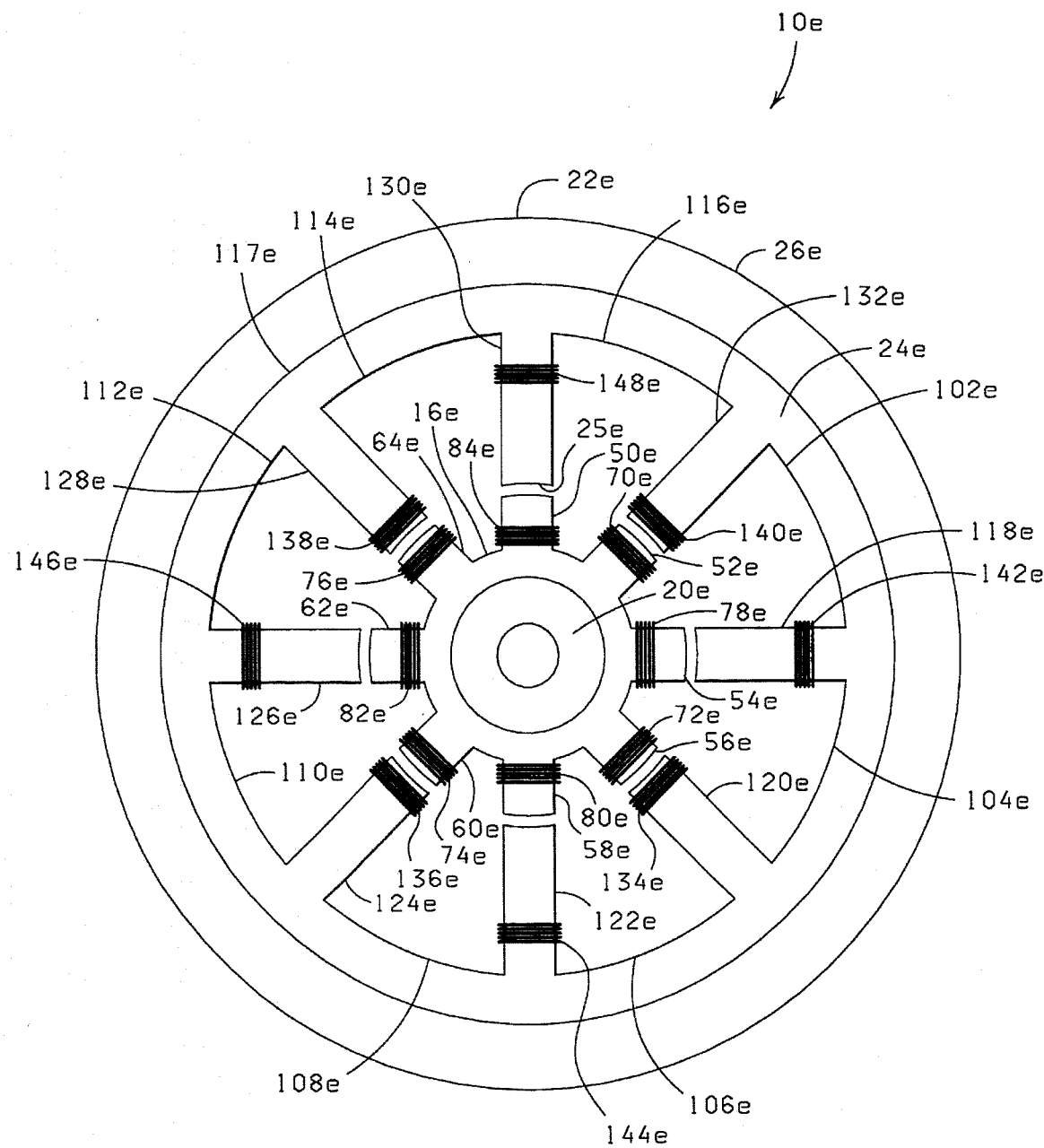
FIG. 13 is an end view of the rotor shown in FIG. 10, disposed within a stator assembly in accordance with the present invention.

FIG. 13 shows an assembly 10e constructed in accordance with another embodiment of the present invention. A rotor 16e, constructed in generally the same manner as the rotor 16c shown in FIG. 10, is disposed within a stator 22e. The stator 22e has an inner section 24e further comprising an inner surface 25e and composed of a magnetizable material, such as iron or iron laminates. The stator 22e further has an enclosure 26e, which, in a preferred embodiment, is composed of a non-magnetizable material such as aluminum or plastic.

The inner surface 25e of the inner section 24e is formed into a polarity of stator flux path reduction slots, eight of the slots being shown in FIG. 10, and designated by the numbers 102e, 104e, 106e, 108e, 110e, 112e, 114e and 116e. The inner section 24e further comprises a polarity of pole posts, defined by the flux path reduction slots and designated by the numbers 118e, 120e, 122e, 124e, 128e, 130e and 132e.

The stator 22e comprises a first set of stator flux path reduction windings 134e, 136e, 138e and 140e, wound on pole posts 120e, 124e, 128e and 132e, respectively. The stator 22e additionally comprises a second set of stator flux path reduction windings 142e, 144e, 146e, and 148e wound on pole posts 118e, 122e, 126e and 130e, respectively. The first set and second sets of stator flux path reduction windings are disposed upon the stator 22e in about the same manner as the first and second sets of rotor flux path reduction windings disposed on the rotor 16c shown in FIGS. 10 and 11.

In the embodiments of the rotors shown in FIGS. 7, 8, 10, 12 and 13, and the stators shown in FIGS. 12 and 13, it is understood that the rotors and stators have been represented to show the features of the present invention, and are otherwise constructed in accordance with the art. For example, insulation, such as insulation paper, is used in practice to line the flux path reduction slots, as shown in FIG. 4.

Figure 14:
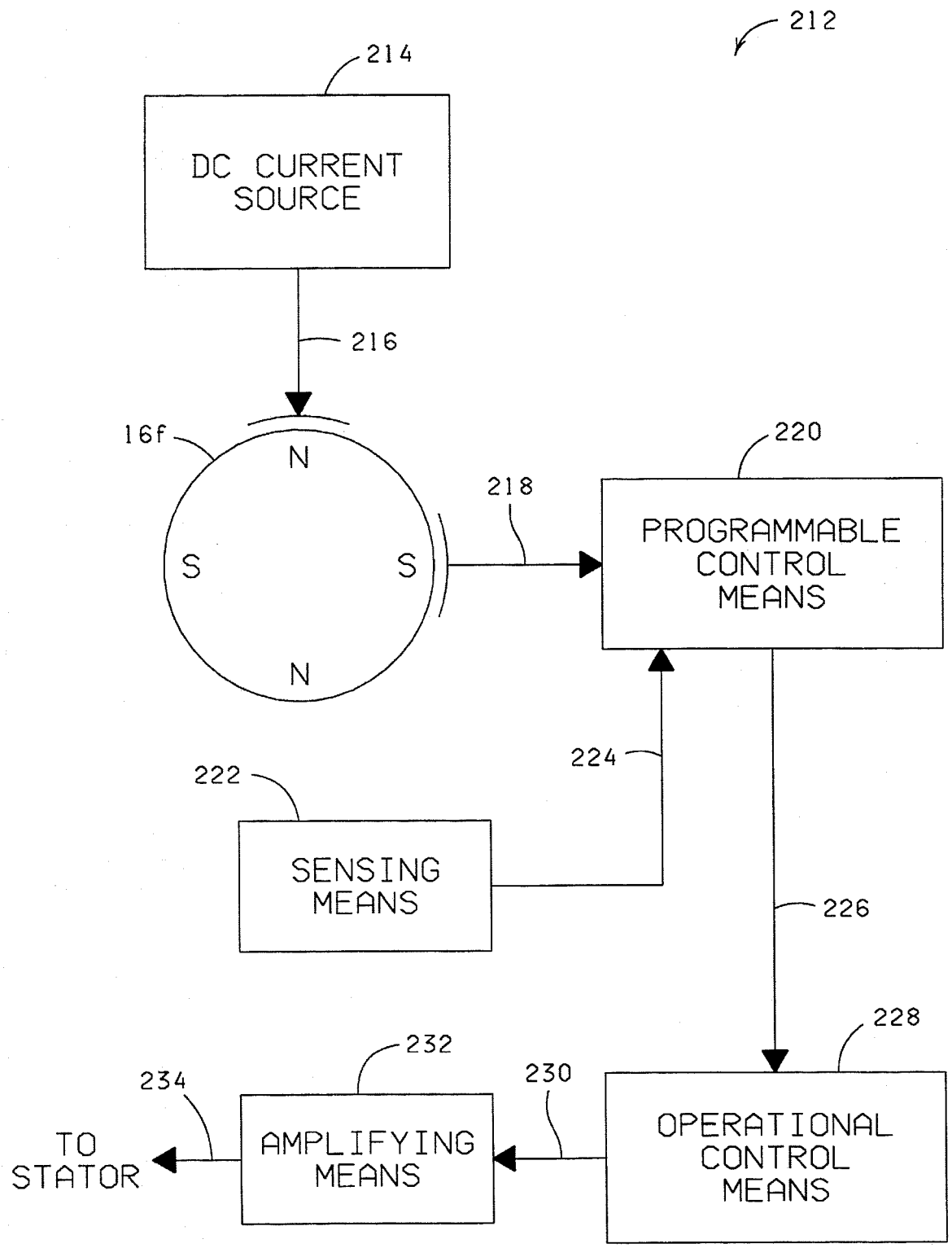
FIG. 14 is a diagrammatic view of a control constructed in accordance with the present invention.

FIG. 14 diagrammatically shows a control 212, to be used as part of a DC electric motor constructed in accordance with the present invention. The control 212 comprises a DC or DCP current source 214 which passes a DC or DCP current via current path 216 and via current transferring means, such as slip rings, to a rotor 16f. The rotor 16f shown in FIG. 14 has electromagnetic armature windings disposed thereon to provide the "north" poles interposed between the "south" poles. Current is transferred from the electromagnetic windings, via slip rings, and current path 218 to a programmable control means 220.

The control 212 also includes a sensing means 222 which is positioned such that the sensing means 222 can sense the "north" oriented electromagnetic poles or the "south" oriented electromagnetic oriented poles on the rotor 16f, as the electromagnetic poles rotate on the rotor 16f past the sensing means 222. In a preferred embodiment of the invention, the sensing means 222 will comprise a Hall Effect sensor, or a light sensing device. The sensing means 222 outputs a sensing signal via signal path 224 to the programmable control means 220. The programmable control means 220 can comprise an embedded controller which executes firmwear stored in EPROM or EEPROM. The firmwear processes the signal received from the sensing means 222 and derives an output signal which is transmitted via signal path 226 to an operational control means 228.

The programmable control means 220 can further comprise an acceleration switch (not shown) which outputs a control signal to the programmable control in order to increase the velocity of the motor, and a deceleration switch (not shown) which outputs a deceleration signal to the programmable control means 220 in order to decrease the velocity of the motor.

The operational control means 228 can comprise a delay module which delays a portion of the control signal sent via signal path 226 in order to eliminate the possibility of shoot through current when the polarity of the current is changed. The delay module also decodes portions of the control signal sent via signal path 226 into a P-channel control and an N-channel control.

The operational control means 228 outputs operational signals comprising P and N channel control currents via signal path 230 to amplifying means 232. The amplifying means 232 amplifies the N-channel and the P-channel control currents, applies the control currents to the gates of a full bridge and further amplifies the N-channel and the P-channel currents to provide a drive current, via the drive path 234, to drive the stator. Current inverting means, as known in the art, change the polarity of electromagnetic windings disposed on the stator. Alternately, in the absence of current inverting means, current may turned on an off, alternately activating and deactivating the electromagnetic windings, thereby driving the rotor.

Figure 15:
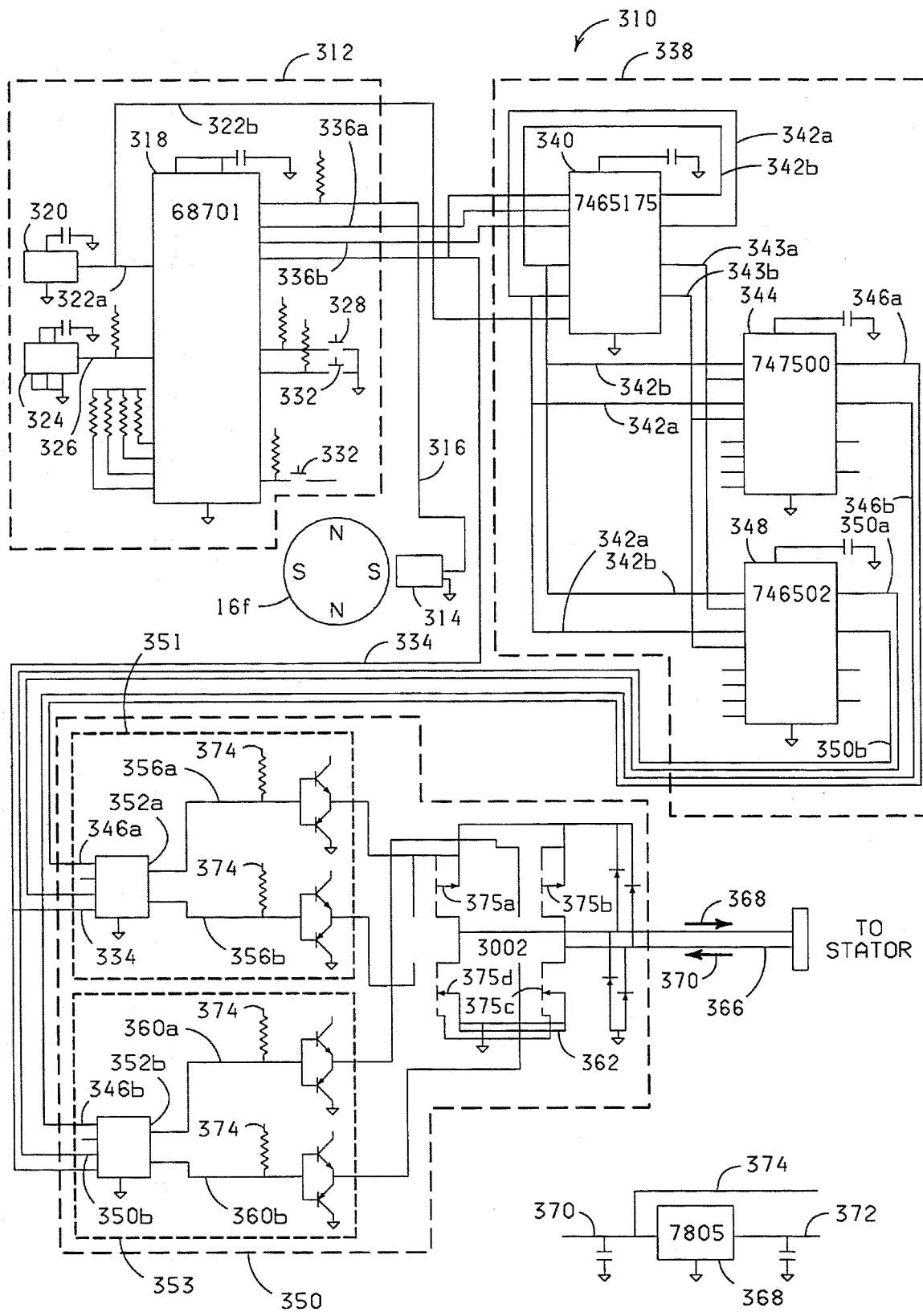
FIG. 15 is a schematic diagram of a circuit embodying the control shown in FIG. 14.

Shown in FIG. 15 is the diagram of a control circuit 310 which embodies the control 212 shown in in FIG. 14.

The control circuit 310 sensing means comprises a Hall Effect sensor 314, manufactured by Micro Switch, Inc., Part No. SS441A. The Hall Effect sensor 314 outputs, via signal path 316, an interrupt signal when the sensor 314 senses a "south" pole on the rotor 16f passing the sensor 314. The interrupt signal is input to the programmable control means 312, comprising an imbedded controller 318, manufactured by Motorola, Part No. MC68701U4.

The embedded controller 320 is additionally connected to a 4.0 MHz clock oscillator 320 via signal path 322a, to a voltage monitor 324 (manufactured by Maxim, Part No. MAX699) via signal path 326, to a SPST motor acceleration switch 328, to a SPST motor deceleration switch 330, and to a SPST motor on-off switch 332. The voltage monitor 324 monitors the voltage input to the embedded controller 318 from a voltage regulator 368 and initiates a reset if the voltage varies more than ten per cent, or if the voltage is interrupted.

The embedded controller emits a disable power signal to the amplifying means 351 via signal path 334 when the on-off switch 332 is placed in the "off" position. The embedded controller 318 also emits an AHALF signal via signal path 336a and a BHALF signal via signal path 336b. State changes in the AHALF and the BHALF signals are determined by firmware contained in EPROM within the embedded controller 318. State changes can be altered by activating the motor acceleration switch 328, which increases velocity, or by activating the motor deceleration switch 330, which decreases velocity. The following program comprises the firmware, and causes AHALF and BHALF state changes in accordance with the present invention:

```
;
;
;----------------------------------------------------------------
; THIS INTERRUPT OCCURS WHEN THE COUNTER REGISTER EQUALS THE
; OUTPUT COMPARE REGISTER. THIS OCCURS WHEN THE LOW WORD OF
; DELAY EQUALS THE OCR.
;----------------------------------------------------------------
;
;
DELAY_TIMER        LDAA    TCSR              ;CLR INT
                   LDD     OCR
                   STD     OCR               ;CLR INT
                   TST     SWITCH_COUNT      ;TST HIGH BYTE FOR ZERO
                   BEQ     :+1
                   RTI
;
;
                   JSR     POLE_COMPLIMENT
                   LDAA    #1
                   STAA    POLE_CHANGED
;
;
;------------------------------
; DISABLE OCR INTERRUPT
;------------------------------
;
;
                   LDAA    TCSR
                   ANDA    #%11110111
                   STAA    TCSR
                   RTI
;
;
                   END
;
```

```
;
;
;----------------------------------------------------------------
; TIME EQUATES
;
; THE FOLLOWING TIMES ARE BASED ON THE 68701 COUNTER RUNNING AT 1 MHZ
; ALSO, THE FOLLOWING TIMES ARE COUNTS PER PERIOD.
;
; IDLE VELOCITY OF 3600 = 463 US
;----------------------------------------------------------------
;
;
COUNT_50RPM            EQU    33333         ;50 RPM
COUNT_1000RPM          EQU    1666          ;1000 RPM
COUNT_2000RPM          EQU    833           ;2000 RPM
COUNT_3000RPM          EQU    555           ;3000 RPM
DEBOUNCE_NUM_MAX       EQU    255           ;MAX NUMBER OF ACTIVE SWITCH
                                            ;STATES
G                      EQU    8             ;GAIN - VELOCITY REGULATION
IDLE_VEL_COUNT_10DOWN  EQU    509           ;MIN VELOCITY TO REGULATE -10%
IDLE_VEL_COUNT_10UP    EQU    417           ;MAX VELOCITY TO REGULATE- +10%
IDLE_VEL_COUNT         EQU    463           ;IDLE VELOCITY
K1                     EQU    5             ;ADD OR SUB TO LAST DELAY
                                            ;TO REGULATE VELOCITY
K2                     EQU    5             ;UNIT TIME DELAY - VELOCITY
                                            ;REGULATION
LEAD_COUNT_0RPM        EQU    0             ;DELTA_COUNT  - LEAD_COUNT =
                                            ;DELAY_COUNT
LEAD_COUNT_50RPM       EQU    400           ;DELTA_COUNT  - LEAD_COUNT =
                                            ;DELAY_COUNT
LEAD_COUNT_1000RPM     EQU    400           ;DELTA_COUNT  - LEAD_COUNT =
                                            ;DELAY_COUNT
LEAD_COUNT_2000RPM     EQU    300           ;DELTA_COUNT  - LEAD_COUNT =
                                            ;DELAY_COUNT
LEAD_COUNT_3000RPM     EQU    200           ;DELTA_COUNT  - LEAD_COUNT =
                                            ;DELAY_COUNT
LEAD_COUNT_MAX         EQU    250           ;MIN DELAY COUNT. MAXIMUM ADV
                                            ;ALLOWED BY VELOCITY CONTROL
;
;
;------------------
; PORT EQUATES
;------------------
;
;
P1DDR                  EQU    $0            ;PORT 1 DATA DIR REG
P2DDR                  EQU    $1            ;PORT 2 DATA DIR REG
P3DDR                  EQU    $4            ;PORT 3 DATA DIR REG
P4DDR                  EQU    $5            ;PORT 4 DATA DIR REG
P1DR                   EQU    $2            ;PORT 1 DATA REG
P2DR                   EQU    $3            ;PORT 2 DATA REG
P3DR                   EQU    $6            ;PORT 3 DATA REG
P4DR                   EQU    $7            ;PORT 4 DATA REG
TCSR                   EQU    $8            ;TIMER CONTROL STATUS REG
CR                     EQU    $9            ;CONTROL REG
OCR                    EQU    $B            ;OUTPUT CAPTURE REG
ICR                    EQU    $D            ;INPUT CAPTURE REG
RCR                    EQU    $14           ;RAM CONTROL REG
;
STACKPTR               EQU    $FF           ;STACK POINTER
;
;
                       END
;
```

```
                         SEG     RWM
    COUNT                DS      2
    DELAY_COUNT          DS      2
    DISABLE              DS      1
    DISABLE_DEBOUNCED    DS      1
    DISABLE_DEBOUNCE_NUM DS      1
    DOWN_DEBOUNCED       DS      1
    DOWN_DEBOUNCE_NUM    DS      1
    ERR                  DS      1
    FIRST_HALL           DS      1
    ICRH                 DS      1
    IDLE_COUNT_10DOWN    DS      2
    IDLE_COUNT_10UP      DS      2
    IDLE_COUNT           DS      2
    LEAD_COUNT           DS      2
    NEW_COUNT            DS      3
    POLE_CHANGED         DS      1
    SECOND_HALL          DS      1
    SWITCH_COUNT         DS      3
    TEMP                 DS      3
    UP_DEBOUNCED         DS      1
    UP_DEBOUNCE_NUM      DS      1
;
;
                         END
;
```

```
;
;----------------------------------------
; FALLING EDGE OF HALL SENSOR IS DETECTED
;----------------------------------------
;
;
HALL            LDAA    TCSR                ;CLR INT
                LDAA    ICR
                LDAB    ICR+1               ;CLR INT - HIGH BYTE
                STD     NEW_COUNT+1
                LDAA    ICRH
                DECA                        ;OVERFLOW WHEN CR IS RESET
                STAA    NEW_COUNT
                CLR     ICRH
                STAA    CR                  ;RESET CR TO $FFF0
;
;
;----------------------------------------
; DETERMINE THE STATE EDGE OF THE NEXT HALL
;----------------------------------------
;
;
                LDAA    P2DR
                BITA    #%00000001
                BNE     :+1                 ;BRANCH IF BLACK
                LDAA    TCSR
                ORA     #%00000010          ;LOOK FOR POS EDGE
                                            ;OR BLACK
                STAA    TCSR
                BRA     STORE_NEW_COUNT
;
;
                LDAA    TCSR
                ANDA    #%11111101          ;LOOK FOR NEG EDGE
                                            ;OR WHITE
                STAA    TCSR
;
;
;----------------------------------------
; STORE LARGEST NEW_COUNT
;----------------------------------------
;
;
STORE_NEW_COUNT LDD     NEW_COUNT+1
                SUBD    COUNT+1
                BLT     :+2
                BEQ     :+1
                LDD     NEW_COUNT+1
                STD     COUNT+1
                BRA     :+2
;
;
                LDAA    NEW_COUNT
                CMPA    COUNT
                BLE     :+1
                STAA    COUNT
;
                TST     POLE_CHANGED
                BNE     :+1
                JSR     POLE_COMPLIMENT
;
                CLR     POLE_CHANGED
                TST     FIRST_HALL
                BNE     SECOND_HALL_TST
;
;
```

```
;---------------------------------------
; INDICATE THAT THE FIRST HALL SENSOR WAS RECEIVED
;---------------------------------------
;
;
                        LDAA    #1
                        STAA    FIRST_HALL
                        RTI
;
;
;---------------------------------------
; TEST SECOND HALL SENSOR
;---------------------------------------
;
;
;---------------------------------------
; TEST THE POLE CHANGE FLAG. IF CLR, THE POLES HAVE NOT COMPLIMENTED.
; DO SO AT THIS TIME
;---------------------------------------
;
;
SECOND_HALL_TST         TST     SECOND_HALL
                        BNE     FIND_DELAY
;
;
;---------------------------------------
; INDICATE THAT THE FIRST HALL SENSOR WAS RECEIVED
;---------------------------------------
;
;
                        LDAA    #1
                        STAA    SECOND_HALL
;
;
;---------------------------------------
; FIND THE NEXT COMMUTATION PERIOD BY CALCULATING DELAY.
; COMMUTATION WILL OCCUR AT THE END OF THE DELAY TIME
;---------------------------------------
;
;
;---------------------------------------
; IS DELTA IN IDLE RANGE?
;---------------------------------------
;
;
FIND_DELAY              LDD     #IDLE_VEL_COUNT_100DWN  ;MIN VELOCITY
                        SUBD    NEW_COUNT+1
                        LDAA    #0
                        SBCA    NEW_COUNT
                        BLT     CALC_ACCEL_DELAY        ;BRANCH IF OUT OF RANGE
;
                        LDD     NEW_COUNT+1
                        SUBD    #IDLE_VEL_COUNT_10UP    ;MAX VELOCITY
                        LDAA    NEW_COUNT
                        SBCA    #0
                        BLT     CALC_ACCEL_DELAY        ;BRANCH IF OUT OF RANGE
;
;
;---------------------------------------
; REGULATE THE VELOCITY BY ADDING OR SUBTRACTING K2 X G X ERR, WHERE;
; K2 - UNIT TIME DELAY
; G - GAIN
; ERR - DESIRED PERIOD COUNT - CURRENT PERIOD COUNT
;---------------------------------------
;
```

```
;REG_VEL                    LDD    NEW_COUNT+1
;                           SUBD   #IDLE_VEL_COUNT
;                           STAB   ERR
;                           BGT    VEL_TO_SLOW
;                           BLT    VEL_TO_FAST
;                           JMP    FIND_DELAY_END              ;VELOCITY  OK
;
;VEL_TO_SLOW                LDAA   ERR
;                           LDAB   6
;                           MUL
;                           LDAA   K2
;                           MUL
;                           STD    TEMP
;                           LDD    DELAY_COUNT+1
;                           SUBD   TEMP
;                           STD    DELAY_COUNT+1
;                           LDAA   DELAY_COUNT
;                           SBCA   #0
;                           STAA   DELAY_COUNT
;                           JMP    FIND_DELAY_END
;
;VEL_TO_FAST                LDAA   ERR
;                           LDAB   6
;                           MUL
;                           LDAA   K2
;                           MUL
;                           STD    TEMP
;                           LDD    DELAY_COUNT+1
;                           ADDD   TEMP
;                           STD    DELAY_COUNT+1
;                           LDAA   DELAY_COUNT
;                           ADCA   #0
;                           STAA   DELAY_COUNT
;                           JMP    FIND_DELAY_END
;
;-----------------------------------------------------------------------
; REGULATE THE VELOCITY BY ADDING OR SUBTRACTING K1 TO/FROM THE DELAY
; IF THE ERROR (NEW_COUNT - IDLE_VEL_COUNT) IS - OR + RESPECTIVELY
;-----------------------------------------------------------------------
;
REG_VEL                     LDD    NEW_COUNT+1
                            SUBD   #IDLE_VEL_COUNT
                            LDAA   NEW_COUNT
                            SBCA   #0
                            BGT    VEL_TO_SLOW
                            BLT    VEL_TO_FAST
                            JMP    FIND_DELAY_END              ;VELOCITY  OK
;
VEL_TO_SLOW                 LDD    DELAY_COUNT+1
                            SUBD   K1
                            STD    DELAY_COUNT+1
                            LDAA   DELAY_COUNT
                            SBCA   #0
                            STAA   DELAY_COUNT
;
;
;-----------------------------------------------------------------------
; DO NOT DECREASE THE DELAY_COUNT BELOW DELAY_COUNT_MIN.
; THIS IS THE MAXIMUM ADVANCE ALLOWED TO VELOCITY REGULATE.
;-----------------------------------------------------------------------
;
;
```

```
;----------------------------------------
; NOW FIND THE MINIMUM DELAY
;----------------------------------------
;
;
                        LDD     NEW_COUNT+1
                        SUBD    #LEAD_COUNT_MAX
                        STD     TEMP+1
                        LDAA    NEW_COUNT
                        SBCA    #0
                        STAA    TEMP
;
;
;----------------------------------------
; IS CURRENT DELAY GREATER THAN MINIMUM DELAY
;----------------------------------------
;
;
                        LDD     DELAY_COUNT+1
                        SUBD    TEMP+1
                        LDAA    DELAY_COUNT
                        SBCA    TEMP
                        BGE     FIND_DELAY_END
;
;
;----------------------------------------
; APPLY MINIMUM DELAY
;----------------------------------------
;
;
                        LDD     TEMP+1
                        STD     DELAY_COUNT+1
                        LDAA    TEMP
                        STAA    DELAY_COUNT
                        BRA     FIND_DELAY_END
;
VEL_TO_FAST             LDD     DELAY_COUNT+1
                        ADDD    #1
                        STD     DELAY_COUNT+1
                        LDAA    DELAY_COUNT
                        ADCA    #0
                        STAA    DELAY_COUNT
;
;
;----------------------------------------
; DO NOT LET DELAY_COUNT GO LARGER THAN NEW_COUNT
;----------------------------------------
;
;
                        LDD     NEW_COUNT+1
                        SUBD    DELAY_COUNT+1
                        LDAA    NEW_COUNT
                        SBCA    DELAY_COUNT
                        BGE     FIND_DELAY_END
                        LDD     NEW_COUNT+1           ;DON'T GO MORE THAN
                        STD     DELAY_COUNT+1         ;NEW_COUNT
                        LDAA    NEW_COUNT
                        STAA    DELAY_COUNT
                        BRA     FIND_DELAY_END
;
;
;----------------------------------------
; DETERMINE THE MOTOR RPM RANGE.
;                       RPM RANGE    LEAD ANGLE
```

```
; COUNT_50RPM            0-50            LEAD_COUNT_50
; COUNT_1000RPM          51-1000         LEAD_COUNT_1000RPM
; COUNT_2000RPM          1001-2000       LEAD_COUNT_2000RPM
; COUNT_3000RPM          2001-3000       LEAD_COUNT_3000RPM
; COUNT_4000RPM          3001-4000       LEAD_COUNT_4000RPM
;----------------------------------------------------------------
;
;
;-------------------
; OVER 3000 RPM
;-------------------
;
CALC_ACCEL_DELAY        LDD     #COUNT_3000RPM
                        STD     TEMP
                        LDD     #LEAD_COUNT_3000RPM
                        STD     LEAD_COUNT
                        BSR     CALC_DELAY_COUNT
                        BCS     FIND_DELAY_END
;
;
;-------------------
; 2000-3000  RPM
;-------------------
;
;
                        LDD     #COUNT_2000RPM
                        STD     TEMP
                        LDD     #LEAD_COUNT_2000RPM
                        STD     LEAD_COUNT
                        BSR     CALC_DELAY_COUNT
                        BCS     FIND_DELAY_END
;
;
;-------------------
; 1000-2000  RPM
;-------------------
;
;
                        LDD     #COUNT_1000RPM
                        STD     TEMP
                        LDD     #LEAD_COUNT_1000RPM
                        STD     LEAD_COUNT
                        BSR     CALC_DELAY_COUNT
                        BCS     FIND_DELAY_END
;
;
;-------------------
; 50-1000  RPM
;-------------------
;
;
                        LDD     #COUNT_50RPM
                        STD     TEMP
                        LDD     #LEAD_COUNT_50RPM
                        STD     LEAD_COUNT
                        BSR     CALC_DELAY_COUNT
                        BCS     FIND_DELAY_END
;
;
;-------------------
; UNDER 50 RPM
;-------------------
;
```

```
                        LDD     #LEAD_COUNT_ORPM
                        STD     LEAD_COUNT
                        LDD     NEW_COUNT+1
                        SUBD    LEAD_COUNT
                        STD     DELAY_COUNT+1
                        LDAA    NEW_COUNT
                        SBCA    #0
                        STAA    DELAY_COUNT
;
;
;----------------------------------------------------------
; ADD THE DIFFERENCE - 400 TO THE COUNT JUST RECORDED
;----------------------------------------------------------
;
;
FIND_DELAY_END          LDD     DELAY_COUNT+1
                        STD     SWITCH_COUNT+1
                        STD     OCR
                        LDAA    DELAY_COUNT
                        INCA                            ;OVERFLOW WHEN CR IS RESET
                        STAA    SWITCH_COUNT
;
;
;----------------------------------------------------------
; ENABLE OUTPUT COMPARE INTERRUPT
;----------------------------------------------------------
;
;
                        LDAA    TCSR
                        ORA     #%00001000
                        STAA    TCSR
                        RTI
;
;
;----------------------------------------------------------
; COMPLIMENT THE POLARITY OF THE STATOR POLES
;----------------------------------------------------------
;
;
POLE_COMPLIMENT         TST     DISABLE
                        BEQ     *+1
                        RTS
;
                        LDAA    P1DR
                        BITA    #%00000001
                        BNE     *+1                     ;BRANCH IF BLACK
                        ANDA    #%11111101
                        ORA     #%00000001
                        STAA    P1DR
                        RTS
;
                        ANDA    #%11111110
                        ORA     #%00000010
                        STAA    P1DR
                        RTS
;
;
;----------------------------------------------------------
; CALC THE DELAY_COUNT BY SUBTRACTING THE LEAD_COUNT FROM
; THE NEW_COUNT OF THE LAST STATE DURATION
;----------------------------------------------------------
;
;
CALC_DELAY_COUNT        LDD     TEMP
                        SUBD    NEW_COUNT+1
```

```
        LDAA    #0
        SBCA    NEW_COUNT
        BGE     :+1                     ;BRANCH IF IN RANGE
        CLC
        RTS

LDB     NEW_COUNT+1
        SUBB    LEAD_COUNT
        STD     DELAY_COUNT+1
        LDAA    NEW_COUNT
        SBCA    #0
        STAA    DELAY_COUNT
        SEC
        RTS

END
```

```
;
;
;------------------
; INITIALIZE
;------------------
;
;
INIT_PORT           LDAA    TCSR            ;CLR INT
                    LDAA    CR              ;CLR OVERFLOW INT
                    STD     OCR             ;CLR OUTPUT COMPARE INT
                    LDAA    ICR             ;CLR INPUT CAPTURE INT
                    LDAA    #%00000111      ;BIT 3,4,5,6,7 INPUT,
;                                           ;REST OUTPUT
                    STAA    P1DDR
                    LDAA    #%00011110      ;BIT 0 INPUT, REST OUTPUT
                    STAA    P2DDR
                    LDAA    #%00010110
                    STAA    TCSR
;                                           ;XFER ON POS EDGE
;                                           ;ENABLE OVERFLOW INT
;                                           ;DISABLE OUTPUT COMPARE INT
;                                           ;ENABLE INPUT CAPTURE INT
                    LDD     #0              ;OUTPUT COMPARE NUMBER
                    STD     OCR             ;WRITE OUTPUT COMPARE REG
                    LDAA    RCR
                    ORA     #%01000000
                    STAA    RCR
                    LDAA    #%00000000      ;DISABLE OUTPUT DRIVERS
                    STAA    P1DR
                    LDAA    #0
                    STAA    P2DR
                    RTS
;
;
;------------------------------------------------
; RUN AT POWER UP RESET AND ON A CLEAR
;------------------------------------------------
;
;
INIT_VAR            LDD     #0
                    STD     COUNT+1
                    STAA    COUNT
                    STD     DELAY_COUNT+1
                    STAA    DELAY_COUNT
                    STAA    DISABLE
                    STAA    DISABLE_DEBOUNCED
                    STAA    DOWN_DEBOUNCED
                    STAA    ERR
                    STAA    FIRST_HALL
                    STAA    ICRH
                    STD     LEAD_COUNT
                    STD     NEW_COUNT+1
                    STAA    NEW_COUNT
                    STAA    POLE_CHANGED
                    STAA    SECOND_HALL
                    STD     SWITCH_COUNT+1
                    STAA    SWITCH_COUNT
                    STD     TEMP+1
                    STAA    TEMP
                    STAA    UP_DEBOUNCED
;
                    LDD     #IDLE_VEL_COUNT_10DOWN
                    STD     IDLE_COUNT_10DOWN
                    LDD     #IDLE_VEL_COUNT_10UP
                    STD     IDLE_COUNT_10UP
```

```
        LDD     #IDLE_VEL_COUNT
        STD     IDLE_COUNT

LDAA    #DEBOUNCE_NUM_MAX
        STAA    DISABLE_DEBOUNCE_NUM
        STAA    DOWN_DEBOUNCE_NUM
        STAA    UP_DEBOUNCE_NUM
        RTS
```

```
;----------------------------------------
; UPDATES TO THE SOFTWARE
;
;
; VERSION 1.0 - 4/1/93            JON BUCKMAN
;----------------------------------------
;
;
;----------------------------------------
; THIS IS THE MAIN ROUTINE. IT INCORPORATES  EQUATES  AND A
; MONITOR LOOP.
;----------------------------------------
;
;
                    DEFS    INTERRUPTS,$FFF0
                    DEFS    ROM,$FB00           ;PROGRAM STORAGE AREA
                    DEFS    RWM,$80             ;RWM
;
;
;----------------------------------------
; LIBRARY VARIABLES
;----------------------------------------
;
;
                    LIB     EQUATES.LIB
                    LIB     GLOBALS.LIB
;
;
;----------------------------------------
; INTERRUPTS
;----------------------------------------
;
;
                    SEG     INTERRUPTS
                    DW      $0,OVERFLOW,DELAY_TIMER,HALL,$0,$0,$0,START
;
;
;----------------------------------------
; PROGRAM
;----------------------------------------
;
;
;----------------------------------------
; ********  START OF MAIN LOOP  ********
;----------------------------------------
;
;
                    SEG     ROM
START               SEI                         ;SET INT MASK
                    LDS     #STACKPTR
                    JSR     INIT_PORT           ;INITIALIZE  THE PORT(S)
                    JSR     INIT_VAR            ;INITIALIZE  VARIABLES
                    JSR     START_STATE         ;FINDS CORRECT STATE TO START
                    CLI                         ;CLEAR INT MASK
;
;
;----------------------------------------
; START MONITOR LOOP
;----------------------------------------
;
;
;----------------------------------------
; EXAMINE INC VELOCITY SWITCH
;----------------------------------------
```

```
;
BEGIN                   JSR     VEL_UP
;
;
;------------------------------------
; EXAMINE DEC VELOCITY SWITCH
;------------------------------------
;
;
;
;
;
;------------------------------------
; EXAMINE DISABLE SWITCH
;------------------------------------
;
;
                        JSR     DISABLE_DRIVER
                        JSR     VEL_DOWN
                        JMP     BEGIN
;
;
;
;---------------------------------------
; ******** END OF MAIN LOOP ********
;---------------------------------------
;
;
;---------------------------
; LIBRARY ROUTINES
;---------------------------
;
;
                        LIB     DELAY_TIMER.LIB
                        LIB     HALL.LIB
                        LIB     INITIALIZE.LIB
                        LIB     OVERFLOW.LIB
                        LIB     START_STATE.LIB
                        LIB     VELOCITY.LIB
                        LIB     CONSTANTS.LIB
;
;
                        END
;
```

```
;----------------------------------------------------------------
; OVERFLOW INTERRUPT WHEN THE HIGH BYTE OF DELAY_COUNT IS TO BE
; DECREMENTED  AND ICRH IS TO BE INCREMENTED
;----------------------------------------------------------------
;
;
OVERFLOW        LDAA    TCSR            ;CLR INT
                LDAA    CR              ;CLR INT - HIGH BYTE
                DEC     SWITCH_COUNT
                INC     ICRH
                RTI
;
;
                END
;
```

```
;
;--------------------------------------------------------
; FIND THE CORRECT STATE TO START THE MOTOR BY EXAMINING P20
; OR HALL INPUT.
;--------------------------------------------------------
;
;
START_STATE         JSR     POLE_COMPLIMENT
                    LDAA    P2DR
                    BITA    #%00000001
                    BNE     :+1                     ;BRANCH IF BLACK
                    LDAA    TCSR
                    ORA     #%00000010              ;LOOK FOR POS EDGE
                                                    ;OR BLACK

STAA    TCSR
                    LDAA    P1DR
                    ANDA    #%11111101
                    ORA     #%00000001
                    STAA    P1DR
                    RTS
;
:                   LDAA    TCSR
                    ANDA    #%11111101              ;LOOK FOR NEG EDGE
                                                    ;OR WHITE
                    STAA    TCSR
                    LDAA    P1DR
                    ANDA    #%11111110
                    ORA     #%00000010
                    STAA    P1DR
                    RTS
;
;
                    END
;
```

```
;------------------------------------------
; INCREMENT OR DECREMENT THE VELOCITY
;------------------------------------------
;
;
VEL_UP              LDAA    P1DR
                    BITA    #%00001000              ;UP SWITCH
                    BNE     ;+1
                    DEC     UP_DEBOUNCE_NUM
                    BNE     VEL_UP_END
                    TST     UP_DEBOUNCED
                    BNE     VEL_UP_END
                    LDD     IDLE_COUNT_10DOWN
                    SUBD    #5
                    STD     IDLE_COUNT_10DOWN
                    LDD     IDLE_COUNT_10UP
                    SUBD    #5
                    STD     IDLE_COUNT_10UP
                    LDD     IDLE_COUNT
                    SUBD    #5
                    STD     IDLE_COUNT
                    LDAA    #1
                    STAA    UP_DEBOUNCED
                    BRA     VEL_UP_END
;
;                   LDAA    #DEBOUNCE_NUM_MAX
                    STAA    UP_DEBOUNCE_NUM
                    CLR     UP_DEBOUNCED
;
;
VEL_UP_END          RTS
;
;
VEL_DOWN            LDAA    P1DR
                    BITA    #%00010000              ;DOWN SWITCH
                    BNE     ;+1
                    DEC     DOWN_DEBOUNCE_NUM
                    BNE     VEL_DOWN_END
                    TST     DOWN_DEBOUNCED
                    BNE     VEL_DOWN_END
                    LDD     IDLE_COUNT_10DOWN
                    ADDD    #5
                    STD     IDLE_COUNT_10DOWN
                    LDD     IDLE_COUNT_10UP
                    ADDD    #5
                    STD     IDLE_COUNT_10UP
                    LDD     IDLE_COUNT
                    ADDD    #5
                    STD     IDLE_COUNT
                    LDAA    #1
                    STAA    DOWN_DEBOUNCED
                    BRA     VEL_DOWN_END
;
;                   LDAA    #DEBOUNCE_NUM_MAX
                    STAA    DOWN_DEBOUNCE_NUM
                    CLR     DOWN_DEBOUNCED
;
;
VEL_DOWN_END        RTS
;
;
DISABLE_DRIVER      LDAA    P1DR
                    BITA    #%00100000              ;DISABLE SWITCH
```

```
                    BNE       :+1
                    DEC       DISABLE_DEBOUNCE_NUM
                    BNE       DISABLE_DRIVER_END
                    TST       DISABLE_DEBOUNCED
                    BNE       DISABLE_DRIVER_END
                    LDAA      P1DR
                    ANDA      #%11111100
                    STAA      P1DR                    ;DISABLE DRIVERS
                    LDAA      #1
                    STAA      DISABLE_DEBOUNCED
                    STAA      DISABLE                 ;STOP FURTHER STATE CHG
                    BRA       DISABLE_DRIVER_END
;
;
                    LDAA      #DEBOUNCE_NUM_MAX
                    STAA      DISABLE_DEBOUNCE_NUM
                    CLR       DISABLE_DEBOUNCED

;
DISABLE_DRIVER_END  RTS
;
;
                    END
;
```

The AHALF and BHALF signals are outputted to an operational control means 338 comprising a delay module 340, a NAND module 344, and a NOR module 348, all manufactured by National Semiconductor (Part Nos. 74LS175, 74LS00, and 74LS02, respectively). The delay module 338 receives a clock signal from the clock 320 via signal path 322b, and places a one microsecond delay on the AHALF signal and the BHALF signal, in order to prevent "shoot through" current effect in the full bridge amplifier 362 contained in the amplifying means 351.

The delay module passes an AHALF signal via signal path 342a and a BHALF signal via signal path 342b, and outputs a delayed AHALF signal via signal path 343a and a delayed BHALF signal via signal path 343b. The AHALF/BHALF and delayed AHALF/BHALF signals are received by the NAND module 344 and the NOR module 348, where the AHALF and BHALF signals are compared with the delayed AHALF and BHALF signals.

The NAND module 344 outputs a P-Channel A signal via signal path 346a to predriver assembly 352a comprising a portion of the amplifying means 351. The NAND module 344 also outputs a P-Channel B signal via signal path 346b to a predriver assembly 352b comprising another portion of the amplifying means 351. The NOR module 348 outputs an N-Channel A signal via signal path 350a to the predriver assembly 352a and an N-Channel B signal via signal path 350b to the predriver assembly 352b.

The P-Channel A signal and the N-Channel A signal are output from a disabler 354a (manufactured by Texas Instruments, Part No. 75471) via signal path 356a and 356b, respectively. The P-Channel A and N-Channel A signals are amplified by transistor bridges 358a and 358b, respectively, which output a PA Out and an NA Out signal, via signal paths 356a and 356 to an amplifier and switching module 362, comprising a full bridge amplifier (Motorola Corporation ICEPACK, Part No. MPM3002).

The P-Channel B signal and the N-Channel B signal are output from a disabler 354b (manufactured by Texas Instruments, Part No. 75471) via signal path 360a and 360b, respectively. The P-Channel B and N-Channel B signals are amplified by transistor bridges 361a and 361b, respectively, which output a PB Out and an NB Out signal, via signal paths 356a and 356 to the amplifier and switching module 362. The predriver assembly 352a is constructed in exactly the same manner as the predriver assembly 352b.

The amplifier and switching module 362 is alternately activated by the PA Out/NB Out signals and by the PB/NA Out signals, whereupon the module 362 alternately outputs a drive current in a direction 368 on the drive paths 364 and 366, to the electromagnetic windings disposed on the stator and substantially simultaneously receives a return current in a direction 370 on the drive paths 366 and 364 from the electromagnetic windings disposed on the stator, as is explained below.

The circuit 310 also comprises a DC current source comprising a voltage regulator 368 manufactured by National Semiconductor, Part No. LM7805. The voltage regulator passes 9–18 V current via current path 373 to the predriver assemblies 352a and 352b, and to the amplifying and switching module 362. the voltage regulator passes 5 V operational current to the Hall Effect sensor 314, the clock 320, the voltage monitor 324, the embedded controller 318, the switches 328, 330, and 332, the delay module 340, the NAND module 344, the NOR module 348, and the predriver assemblies 352a and 352b, all via current path 372.

FIG. 16 shows an exploded view of a flux path and core loss reduction assembly 10a constructed in accordance with the present invention. The flux path and core loss reduction assembly 10a comprises a DC electric motor. The assembly 10a comprises a first end plate 402 having an aperture 403 and bearing assembly (not shown) sized to accommodate and rotatably support a rotor shaft 404. The first end plate 402 is connected to a periphery 406 of an enclosure 408 which comprises a shell 410 made of steel and a shield ring 412 made of aluminum. The enclosure 408 is connected to an end of a stator 430, the shield ring 412 acting to isolate a portion of the stator 430 from the shell 410 of the enclosure 406.

The rotor shaft 404 passes through a rotor 414 via an aperture 417, sized to immovably accommodate the rotor shaft 404. The rotor shaft 404 is constructed of steel. The rotor shaft 404 is separated from a magnetizable peripheral section 419 of the rotor 414 by a core 416. The core 416 is constructed of aluminum. The rotor 414 further comprises thirty-six flux path reduction slots, two of the flux path reduction slots being designated by the numerals 422 and 424. Each pair of flux path reduction slots, such as slots 402 and 404, is separated by a pole post, such as the pole post 426. Alternate pole posts are wound with armature windings (flux path reduction windings) such as the winding designated by the numeral 428. Each of the reduction slots is lined with an insulation paper. One respective insulation paper has been designated by the numeral 429.

The flux path reduction windings disposed on the rotor 414, are constructed in generally the same manner as the flux path reduction windings shown in FIG. 7. The rotor 414 is disposed within the stator 430.

The stator 430 comprises an inner section 432 configured into a plurality of flux path reduction slots such as the slots designated by the numerals 434 and 436. The inner section 432 additionally comprises a plurality of pole posts such as the pole post designated by the number 438. Armature windings, or flux path reduction windings, such as the winding designated by the numeral 440 are disposed on alternate pole posts, in generally the same manner as the flux path reduction windings are disposed on the stator shown in FIG. 12. Each of the flux path reduction slots is lined with insulation paper. A representative insulation paper is designated by the numeral 441.

A second enclosure 442 is connected, via a shield ring 444 to the stator 414. The shield ring 444, which is made of aluminum, acts to separate the stator 414 from the shell 446 of the enclosure 442. The shell 446 in this embodiment is made of steel.

A current transfer assembly 448 is disposed generally within the shell 446 of the exclusive 442 adjacent the rotor 414 and connected to the shell 446. The current transfer assembly 448 comprises two floating carbon brushes or contacts 450a and 450b. The current transfer assembly also comprises a Hall Effort sensor 452. The floating carbon contact 450a acts to transfer electrical power to the armature windings on the rotor 414, via a conductive slip ring 454 on the rotor shaft 404 and the contact 450b takes electric power from the armature windings on the rotor 414 via a slip ring 456 on the rotor shaft 404. A second end plate 458 is connected to the periphery 447 of the shell 446. The end plate 458 is pierced by an aperture 460 which contains bearing means (not shown) sized to movably accept and support a portion of the rotor shaft 404. The rotor shaft 404 extends a distance beyond the first end plate 402 and the second end plate 454, and the extended portion of the rotor shaft 404 can be additionally connected, via gears, belts, or other means, to a load.

The assembly 10a further comprises a control, substantially similar to the control circuit 312 shown in FIG. 15. The control is contained in an aluminum control box (not shown) which is mounted on the assembly 10a.

In operation, a DC electric current is passed via appropriate means to the current transfer assembly 448 and thereafter to the floating carbon contact 450a. Current travels from contact 450a to an armature wire, attached at one end to slip ring 454. The armature windings on the rotor 414 are wound from the armature wire. Current flows through the wire, thereby causing the windings to become polarized, creating a series of "north" and "south" alternating electromagnetic fields. A second end of the armature winding wire is additionally connected to the slip ring 456 and the current passes, via floating carbon contact 450b to additional connecting means which connect the floating carbon contact 452 with the control box.

In the control box, the current is processed, as was explained above, and the rotor movement signalled by the Hall Effect sensor 452 which is located on the current transfer assembly 448, the sensed signal also being outputted to the control box. The resulting power and control current is passed via an armature winding wire to the armature windings on the stator 430. Interposed between the armature windings and the control box is a current inverter (not shown) which, upon receipt of control signals from the control box, alternately changes the direction of current flow through the windings disposed on the stator 430. This has the effect of alternately changing the polarity of the armature windings on the stator 430 from "south" to "north" and from "north" to "south".

The change in polarity of the stator windings has the effect of alternately attracting and repelling the windings on the rotor 414, thereby causing the rotor 414 to turn, in accordance with principles known to the art.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An electromagnetic flux path and core loss reduction assembly, comprising:

a rotor having a first end, a second end, a magnetizable peripheral section, and a nonmagnetizable core section positioned to confine magnetic flux within the rotor to the magnetizable peripheral section, wherein the magnetizable peripheral section has a plurality of flux path reduction slots formed in the magnetizable peripheral section and a plurality of pole posts interposed alternately with the flux path reduction slots;

a rotor shaft extending a distance from at least the first end or the second end of the rotor;

flux path reduction windings wound about every other pole post of the magnetizable peripheral section of the rotor wherein each of the flux path reduction slots of the magnetizable peripheral section partially encompasses a portion of at least one flux path reduction winding; and a stator at least partially encompassing the rotor and circumferentially positioned a distance from the rotor, the stator comprising a magnetizable inner section having an inner surface and an enclosure constructed at least in part of a nonmagnetizable material wherein the inner surface of the stator is positioned substantially adjacent the magnetizable peripheral section of the rotor and wherein the nonmagnetizable material of the enclosure is positioned to magnetically isolate the magnetizable inner section of the stator.

2. An electromagnetic flux path and core loss reduction assembly, comprising:

a rotor having a first end, a second end, a magnetizable peripheral section, and a nonmagnetizable core section positioned to confine magnetic flux within the rotor to the magnetizable peripheral section;

a rotor shaft extending a distance from at least the first end or the second end of the rotor;

a stator, at least partially encompassing the rotor and circumferentially positioned a distance from the rotor, the stator comprising a magnetizable inner section having an inner surface and an enclosure constructed at least in part of a nonmagnetizable material wherein the inner surface of the stator is positioned substantially adjacent the magnetizable peripheral section of the rotor and wherein the nonmagnetizable material of the enclosure is positioned to magnetically isolate the magnetizable inner section of the stator and wherein the magnetizable inner section has a plurality of flux path reduction slots formed in the magnetizable inner section and a plurality of pole posts interposed alternately with the flux path reduction slots; and flux path reduction windings wound about every other pole post of the magnetizable inner section of the stator wherein each of the flux path reduction slots of the magnetizable peripheral section partially encompasses a portion of at least one flux path reduction winding.

3. An electromagnetic flux path and core loss reduction assembly, comprising:

a rotor having a first end, a second end, a magnetizable peripheral section, and a nonmagnetizable core section positioned to confine magnetic flux within the rotor to the magnetizable peripheral section;

a rotor shaft extending a distance from at least the first end or the second end of the rotor;

a stator, at least partially encompassing the rotor and circumferentially positioned a distance from the rotor, the stator comprising a magnetizable inner section having an inner surface and an enclosure constructed at least in part of a nonmagnetizable material wherein the inner surface of the stator is positioned substantially adjacent the magnetizable peripheral section of the rotor and wherein the nonmagnetizable material of the enclosure is positioned to magnetically isolate the magnetizable inner section of the stator and wherein the magnetizable inner section has a plurality of flux path reduction slots formed in the magnetizable inner section and a plurality of pole posts interposed alternately with the flux path reduction slots; and a first set of flux path reduction windings wound about every other pole post of the magnetizable inner section of the stator and a second set of flux path reduction windings wound about the remaining pole posts of the magnetizable inner section of the stator, wherein each of the flux path reduction slots partially encompasses a portion of one flux path reduction winding from the first set of flux path reduction windings and partially encompasses a portion of one flux path reduction winding from the second set of flux path reduction windings.

* * * * *